Patented Apr. 2, 1935

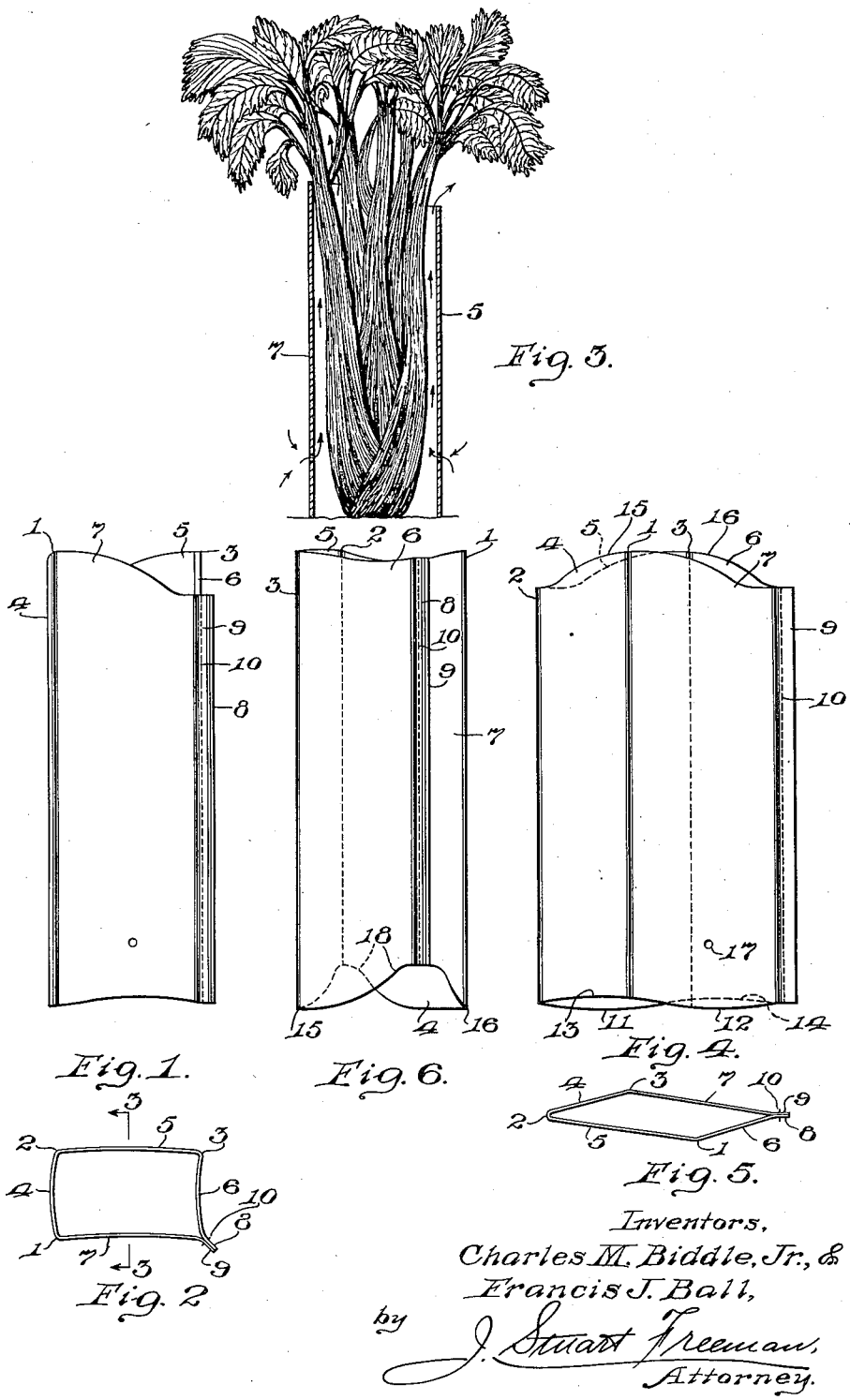

1,996,562

UNITED STATES PATENT OFFICE 1,996,562

CELERY BLEACHER

Charles M. Biddle, Jr., Riverton, N. J., and Francis J. Ball, Willow Grove, Pa., assignors, by direct and mesne assignments, of one-third to said Ball, one-third to Charles M. Biddle, 3d, Riverton, N. J., and one-third to D. P. Mitchell, Woodbury, N. J.

Application July 14, 1933, Serial No. 680,342

5 Claims. (Cl. 47—3)

The object of the invention is to provide improvements in devices such as are used for forcing the growth of rhubarb and the like, and shielding and/or bleaching certain types of plants, such for instance as celery, endive, Japanese salad, and similar plants, but hereinafter the term celery is intended to imply and cover all other plants or articles to which said "bleacher" may be applied.

Instead of the old method of hilling celery rows, to shut out light from the stalks and thereby bleach the same, bleaching devices have been used to a certain extent in the form of sleeves of paper, cardboard, or the like, but thus far all known forms of this development have fallen short of the desired degree of efficiency.

An object therefore is to provide an improved bleacher, comprising a member which is shipped and stored in flat form, but which when in use comprises a hollow figure, which might be described roughly as being irregularly rectangular. That is, it is formed with creases such that from a collapsed flat form it may be readily expanded into a shape which approaches the rectangular in cross section, but the sides of which are inclined to become rounded under the outward pressure of the growing and spreading celery or other stalk.

Another object is to provide a bleacher, which comprises a sheet of cardboard or other suitable material, when in use taking the form of a preferably closed geometrical figure folded along two creases, between which are two or more other creases in the opposite sides of the device, said last-mentioned creases being out of alignment with one another, so that the device from a collapsed position readily opens, instead of merely doubling upon itself as when the last-mentioned creases are in substantial alignment with each other or one another.

Still another object is to provide for a natural upward draft thru the bleacher, for the prevention of rot and mildew and other undesirable conditions, which tend to arise from stagnant damp air around the stalk, and for this purpose the provision of one or more apertures adjacent to the bottom of the bleacher, thru which air passes inwardly before ascending about the stalk under the siphoning or drawing influences of winds and breezes passing across the top of the stalk.

And a still further object is to provide a slightly modified form of the device, the lower end portion of which is scalloped so as to provide in effect one or more spaced cutout regions, thru which air currents can enter the same as tho actual holes were provided, or in addition to such holes, and providing intervening extensions to form supports for the bleacher when in use.

With these and other objects in mind, the invention comprises further details of construction and operation, which are hereinafter fully brought out in the following description, when read in conjunction with the accompanying drawing, in which:—

Fig. 1 is a front elevation of a bleacher comprising one embodiment of the invention in open or extended form;

Fig. 2 is a top plan view of the same;

Fig. 3 is a vertical sectional view of the same, taken on the line 3—3 of Fig. 2 and operatively positioned about a growing celery stalk, as representative of any form of plant stalk or the like, to which the invention can be applied for any purpose whatever, whether or not the act of actual bleaching takes place;

Fig. 4 is an elevational view of the improved bleacher in collapsed position, ready for shipment or storage;

Fig. 5 is a substantially top plan view of the same, but with the sides thereof partly extended for purposes of illustration; and Fig. 6 is an elevational view of a slightly modified form of the device in inverted open position.

Referring to Figs. 1 to 5 inclusive, one embodiment of the invention is shown as comprising a sheet of cardboard of any suitable type, or in fact any other material, and creased along at least three preferably parallel lines 1, 2, and 3, to provide an intervening end section 4 and an intervening side section 5, a second end section 6 being provided upon the laterally opposite side of the crease 3, and a separate side section 7 being provided upon the opposite side of the crease 1, and finally the free marginal edge portions 8 and 9 of the respective last-named end and side sections being secured together by a line of stitches 10 said creases and stitches comprising hinged connections between adjacent sections.

With this construction, the device when folded along the crease 2 will assume a flat position, partially suggested by Fig. 5, but more accurately illustrated by Fig. 4, it being noted that in this position the pairs of end and side sections 5 and 6 and 4 and 7 respectively are in alignment, while the creases 1 and 3 are out of transverse alignment with each other. It will also be noted that the lower end portions 11 and 12 of the side sections 5 and 7 respectively are extended slightly in sweeping curves beyond the oppositely positioned and more restricted terminal portions 13 and 14 of the respective end sections 4 and 6, so that the freely extending portions 11 and 12 offer means for facilitating the opening of the device from a flat condition into the open or hollow position shown in Figs. 1, 2, and 3.

In the same manner, the upper end of the device is characterized by the fact that the adjacent portions of the end and side walls 4 and 7 are extended in substantial alignment with the crease 1, so as to provide a finger-engageable edge portion 15 which extends beyond the adjacent edge of the side 5. Similarly the side and end sections 5 and 6 are together extended in substantial alignment with the crease 3 to provide a freely extending finger-engageable edge 16, which extends substantially beyond the adjacent edge of the side 7, as clearly shown in Fig. 4.

In addition, it will be noted that one or more of the side and end sections are provided adjacent to their lowermost edges with apertures 17 of suitable size to permit the entrance of air currents therethrough, so that an upward draft thru the device when in operative position is maintained about the celery or other stalk, as indicated by the arrows in Fig. 5, thus as hereinbefore referred to preventing the rotting of the stalk, or even a tendency to mildew, as is frequently the case when stagnant damp air is permitted to surround such things as plants, as represented by a celery stalk.

Referring to Fig. 6, the form of the device here shown is substantially a mere inversion of the type shown in Fig. 4, and for reason bears the same numerals, it being noted that only the apertures 17 are missing therefrom, due to the fact that between the free edge portions 15 and 16, which in this case comprise supports for the bleacher, there are provided substantial intervening cutout regions 18, which serve in most cases as adequate entrances for air currents for the purposes hereinbefore described, it being understood that the exact shape, arrangement and extent of the extended portions and cutout regions is largely a matter of choice, as long as the functions hereinbefore described are fully preserved.

We are aware that the invention may be embodied in other specific forms without departing from the spirit or essential attributes thereof, and we therefore desire the present embodiment to be considered in all respects as illustrative and not restrictive, reference being had to the accompanying claims rather than to the foregoing description to indicate the scope of the invention.

Having thus described our invention what we claim as new and desire to protect by Letters Patent is:—

1. A bleacher, comprising a normally oblong hollow tubular element open at the top and bottom and adapted to surround a stalk of celery, and comprising a plurality of wall sections joined together by two oppositely positioned hinged connections operative to permit the element to be folded flat, and by intervening hinged connections out of registry with each other, to prevent the element from folding in closed form upon itself, and to insure the sections readily separating into extended relation, said wall sections being of greater height adjacent to said intervening creases than at regions spaced therefrom.

2. A bleacher, comprising a normally hollow tubular element, comprising opposite side walls each of which terminates in a finger-engageable extended portion opposite to and projecting freely beyond an abbreviated portion of the other wall.

3. A bleacher, comprising a primarily imperforate normally hollow tubular element, comprising side walls terminating in a gradually undulatory edge comprising finger-engageable extended portions separated by relatively abbreviated portions, out of registry with said first portions when said element is collapsed into flat condition, and an aperture in and adjacent to the normal lower portion of one of said walls thru which air currents are adapted to enter the bottom of the bleacher when in operative position, before passing upwardly therethru.

4. A bleacher, comprising when open a normally oblong hollow tubular element open at the top and bottom adapted to surround a plant stalk, said element comprising four wall sections joined together by hinged connections, two opposite connections permitting the collapse of said element into flat condition, the intervening connections being the laterally disposed with respect to each other, to prevent said element folding upon itself, an aperture in the lower portion of one wall section to permit a draft of air to flow inwardly and thence upwardly thru said element when in expanded condition.

5. A bleacher, comprising when open a normally oblong hollow tubular element open at the top and bottom adapted to surround a plant stalk, said element comprising four wall sections joined together by hinged connections, two opposite connections permitting the collapse of said element into flat condition, the intervening connections being then laterally disposed with respect to each other, to prevent said element folding upon itself, an aperture in the lower portion of one wall section to permit a draft of air to flow inwardly and thence upwardly thru said element when in expanded condition, and the edges of said wall sections being gradually undulatory, the height of said walls adjacent the said intervening connections being greater than at said first-named connections, thus providing a laterally positioned longitudinal extension abreast of an abbreviated wall portion, to provide finger-engageable portions extending freely beyond neighboring wall portions when in collapsed condition, to facilitate opening of said element.

CHARLES M. BIDDLE, Jr.
FRANCIS J. BALL.